Dec. 27, 1949     G. HOHWART ET AL     2,492,640

DIAPHRAGM CHUCK

Filed July 13, 1946

INVENTORS.
George Hohwart,
Ernest F. Hohwart.
BY
Harness, Dickey & Pierce
ATTORNEYS.

Patented Dec. 27, 1949

2,492,640

UNITED STATES PATENT OFFICE 2,492,640

DIAPHRAGM CHUCK

George Hohwart and Ernest F. Hohwart, Detroit, Mich., assignors to N. A. Woodworth Company, Ferndale, Mich., a corporation of Michigan Application July 13, 1946, Serial No. 683,456

5 Claims. (Cl. 279—46)

This invention relates to diaphragm chucks and has for its principal object the provision of a chuck of this type of new and improved construction.

Objects of the invention include the provision of a diaphragm chuck having a jaw, jaw base or support immovably secured to its outer face as by welding or brazing whereby possible creeping thereof on the diaphragm is positively precluded; and the provision of a diaphragm chuck having a jaw, jaw base or support on the outer face thereof and a counterbalance on the inner side thereof which jaw, jaw base or support and counterbalance are immovably and fixedly secured to the diaphragm by a bond between them such as is provided by welding or brazing.

Other objects of the invention include the provision of a diaphragm chuck having a jaw support fixed to the outer face thereof and a jaw removably secured to the radially inner end thereof; and the provision of a diaphragm chuck provided with support means for removably mounting jaws thereon for receiving different sizes and/or shapes of work, the means for mounting and securing the jaws to the support being such as to preclude any shifting of the same relative to the diaphragm in operation.

Further objects of the invention include the provision of a diaphragm chuck including a diaphragm and a backing plate therefor in which the two are integrally secured together by brazing or welding so as to form a unitary assemblage; and the provision of a diaphragm chuck in which the diaphragm and all parts directly connected thereto are connected as by welding or brazing in such a manner as to form them as integral parts of the diaphragm.

The above being among the objects of the invention the same consists in certain novel features of construction and combination of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a longitudinal sectional view taken through a diaphragm chuck constructed in accordance with the present invention, as on the line 1—1 of Fig. 2, showing the same mounted on the end of a machine tool spindle;

Figure 1:
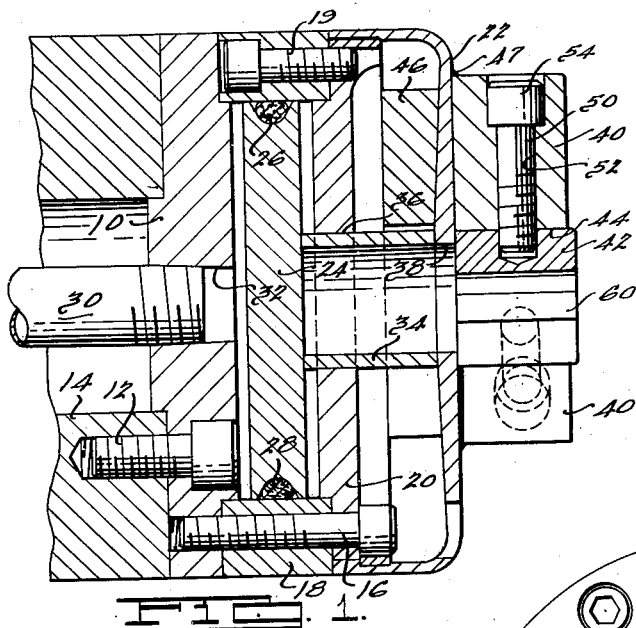

The present invention relates to diaphragm chucks of the general type disclosed, for instance, in United States Letters Patent No. 2,403,599 issued July 9, 1946. Heretofore, it has been customary in connection with such diaphragm chucks to secure the clamping jaws, jaw bases and/or jaw supports, hereinafter broadly referred to as "jaw devices" for the purpose of simplicity in description, to the outer face of the diaphragm by screws, bolts or other means. It has been our experience that regardless of how tightly and securely such jaw devices are so secured to the diaphragm of a diaphragm chuck, the same will eventually become loosened and shift, thereby destroying the accuracy of the chuck. Inasmuch as diaphragm chucks fined their greatest field of use in being able to chuck and consistently hold parts concentric within .001 inch or less, it will be appreciated that the shifting of the jaws ever so slightly with respect to the diaphragm will, temporarily at least, destroy the usefulness of the chuck and will usually result in the production of scrap work.

This shifting of the jaw devices on the diaphragm of a diaphragm chuck, even though the jaws or jaw bases are located and intended to be held against movement by taper pins or the equivalent, probably arises from the fact that because of the flexing of the diaphragm in operation it is substantially impossible to immovably secure any removable part thereto. In accordance with the present invention, the jaw devices are secured to the diaphragm in such a way as to become an integral part thereof, thus definitely precluding any creeping or shifting of the jaw devices relative to the diaphragm regardless of flexure of the latter.

From a practical standpoint and particularly where a diaphragm for a chuck of the type described is of the cup-shaped type shown in the accompanying drawing, the flexing of the diaphragm during movement thereof to move the jaws to release or receive a piece of work substantially disappears at a point slightly spaced inwardly from the periphery of the diaphragm, so that conventional means such as screws or the like may be employed to secure the diaphragm as a periphery to a supporting member, but there are distinct advantages in so securing the diaphragm to the member upon which it is carried as to likewise form it as an integral part thereof. Such advantages stem particularly from the fact that, while a backing plate is employed as indicated in the drawing, it becomes in effect an integral part of the diaphragm which may be machined and assembled as such. It will, of course, be appreciated by those skilled in the art that in those constructions where both a mounting member and a separate backing member are not employed, but instead a single member is employed which is adapted to be secured directly to the machine tool spindle and to which the diaphragm is directly secured, the integration of such member and the diaphragm will result in equivalent benefits. Accordingly, where the term backing plate is employed in the claims relating to this feature, such term is to be interpreted broadly enough to constitute either a backing plate such as shown or a mounting plate where the latter serves both purposes. For the above described reasons, and in accordance with a more limited phase of the present invention, the diaphragm is so integrally united with its associated supporting member as to form, in effect, an integral part thereof.

This securement of the jaw devices to the diaphragm and the diaphragm to its supporting member may be accomplished in any way that may effect the desired result, but from a practical standpoint it is preferably accomplished by either welding or by brazing, preferably by so-called hydrogen brazing. Experience has shown that where the jaw devices are thus secured to the diaphragm, they are rendered substantially integral therewith, so as to thereafter positively and consistently resist any creeping or shifting relative to the diaphragm. Accordingly, jaw devices which are fixed in this manner to the diaphragm remain constantly in the same position and, where it is jaw bases or supports that are fixed to the diaphragm and in turn support removable jaws, the jaws themselves may be so mounted on the supports or bases as to readily maintain their fixed positions. Likewise, where counter-weights are provided on the inner face of the diaphragm to offset the tendency of the centrifugal force of the jaw devices to open up the jaws during operation and are likewise secured to the diaphragm, a similar result is obtained.

Referring now to the accompanying drawing, there is shown a diaphragm chuck comprising a mounting plate 10 shown piloted upon and secured, as by means of screws 12, to the outer end of the spindle 14 of a conventional machine tool such as a grinder, lathe, screw machine or the like. Piloted and mounted upon the forward face of a mounting plate 10 in concentric relation therewith by means of screws such as 16 is a ring member 18, the interior surface of which forms a cylinder as will hereinafter be more apparent. Piloted upon and secured to the forward face of ring member 18 by screws 19 is a backing plate 20. The metal diaphragm 22, which is of generally cup-shaped conformation, has its open end received over and piloted upon the periphery of the backing plate 20 and while in the broader aspects of the invention it may be secured thereto by any suitable means, in accordance with a more limited phase of the invention its open end is so secured, as by welding or brazing, and preferably hydrogen brazing, to the backing plate 20 as to form, in effect, an integral part thereof. No brazing or welding material is actually shown in the drawing for this purpose, but it will be understood to be present the same as the material 47 hereinafter described in connection with the jaw supports. As indicated in the drawing, the diaphragm 22 increases in thickness from its outer periphery toward its inner periphery.

In the particular case shown, a piston 24 is received within the bore of the ring member 18. It is provided with a peripheral groove 26 in which a resilient O-ring 28 is received and compressed to form a packing between the piston 24 and the ring 18. A suitable fluid under pressure may be introduced into the space between the piston 24 and the mounting plate 10 through a pipe or tube 30, and passage 32 in the mounting plate 10, to effect forward movement of piston 24 against the force of the diaphragm 22 in order to flex the diaphragm in a direction to open the jaws. To transmit this force from the piston 24 to the diaphragm 22, a tube 34, concentric with the chuck, slidably projects through a central opening 36 in the backing plate 20 and bears at its opposite ends against the piston 24 and diaphragm 22, respectively. Preferably, the diaphragm 22 is provided with a central opening 38 of the same diameter as the bore of the tube 34 so as to permit work to project into the interior of the chuck when necessary. The above described means for operating the chuck forms no part of the present invention, but is shown claimed in our copending application for Letters Patent of the United States for improvements in Diaphragm chuck, Serial No. 683,458, filed July 13, 1946. It will be understood that any other suitable or conventional means for operating the diaphragm 22 may be employed in place of that shown and described as far as the present invention is concerned.

As previously indicated, the present invention in its broader phases is adaptable to diaphragm chucks in which the jaws are secured directly to the diaphragm, or to constructions in which jaw bases or supports are secured to the diaphragm and in turn removably receive the jaws proper thereon. As a matter of illustration in the drawing the diaphragm 22 is shown provided with jaw supports which removably receive the jaws proper. In accordance with a more limited phase of the invention, the particular jaw supports shown and herein described form one phase of the present invention.

Although it will be appreciated that diaphragm chucks of the type shown may be provided with any desired number of jaws, in the particular case shown by way of illustration three such jaws are employed, each equally angularly spaced with respect to each other about the axis of the chuck. To support each jaw, a jaw support 40 is provided. In the particular case shown, each jaw support 40 comprises a rectangularly sectioned metal block arranged with its length radial with respect to the axis of the chuck. Broadly speaking, each support 40 may be shaped at its radially inner end in any desired manner for complementary reception of a corresponding jaw such as 42, but preferably and as in the case shown, the radially inner faces of the supports 40 are curved about the axis of the chuck to provide a jaw seat 44 and each is at the same identical distance from the axis of the chuck so that it forms a segment of the same cylindrical surface concentric with the axis of the chuck. Such conformation is desired because each seat 44 may be readily ground to exact conformity with each other seat 44 and at exactly the same radial distance from the center of the chuck.

In accordance with the present invention, the supports 40 are welded or brazed, and preferably hydrogen brazed when brazed, to the forward face of the diaphragm 22, and of course, before the surfaces 44 have been brought to their final condition, so that, in effect, they comprise an integral part of the diaphragm 22.

The counterweights 46, one of which is secured to the inner face of the diaphragm 22 in axial alignment with each of the supports 40, are likewise secured to the diaphragm 22 in the same manner as the blocks 40. As previously explained, and as brought out in our prior Patent No. 2,403,599, the counterweights 46 are applied to the inner face of the diaphragm 22 so that in operating the chuck at a relatively high speed the centrifugal force acting on the supports 40 and the jaws 42 will not spring the diaphragm outwardly and release the work in the jaws 42.

From a practical and production standpoint, each jaw 40 and its corresponding counterweight 46 is preferably initially secured to the diaphragm by any suitable means as for instance by rivets, screws or the like so as to hold jaws in the desired position during the welding or brazing operation. No means is shown in the drawing for effecting this result as it has no effect on the final structure, but those skilled in the art will readily appreciate the means by which this may be accomplished.

The welding or brazing material which serves, in effect, to integrally unite the supports 40 and counterweights 46 to the diaphragm 22, is more or less diagrammatically illustrated at 47. Where welding is used then, of course, there will be an actual fusing and intermingling of the welding metal and the metal of the supports 40, diaphragm 22 and counterweights 46, which will serve to integrally unite these parts. Where brazing is employed and properly carried out, while no actual fusing of the metal of the diaphragm 22, supports 40 and counterweights 46 will occur, there will be a commingling of the grain boundaries and alloying of the brazing material with the metal of these parts so as, in effect, to integrally unite them.

The jaws 42 are segmental in character with their radially outer face 48 comprising a segment of a cylindrical surface of identically the same curvature as the surfaces or seats 44 against which they seat. Each jaw 42 is secured to its corresponding support by means of a screw 50 which slidably and rotatably projects down through a central radial opening 52 in the corresponding support 40 and its lower end is threaded into the corresponding jaw 42. Preferably as is shown, the upper end of each opening 52 is counterbored so as to receive the head 54 of the corresponding screw 52 and to form a shoulder against which the force exerted in tightening up the screw may be exerted to clamp the jaw 42 to the support 40. The screws 50 also serve to lock the jaws 42 against lateral movement relative to the seats 44.

Figure 2:
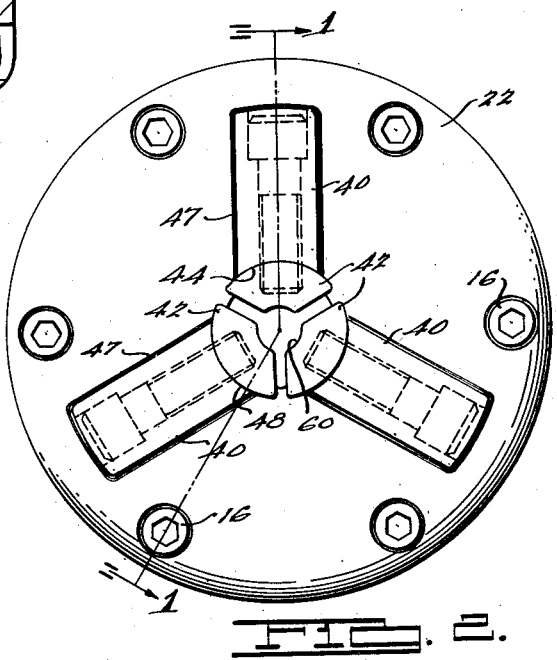
Fig. 2 is a front face view of the diaphragm chuck shown in Fig. 1.

It is the radially inner surfaces of the jaws 42 which receive the work and these inner surfaces may be formed to any size or shape required for any particular size or cross-sectional configuration of the work to be machined in the chuck. For instance, in the construction illustrated in Fig. 2, the inner faces of each jaw 42 are curved as at 60 to provide a segment of a cylindrical surface, all of the surfaces 60 being concentric with the axis of rotation of the chuck and at identically the same distance from such axis so that when a cylindrical piece of work of the proper size is received between the jaws 42 and clamped therein it will be held in accurately concentric relation with respect to the axis of rotation of the chuck.

Figure 3:
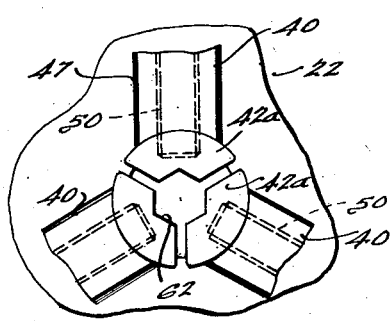
Fig. 3 is a fragmentary view similar to that shown in Fig. 2, but illustrating different forms of jaws applied to the chuck.

In the construction illustrated in Fig. 3, the jaws there illustrated as at 42a are identical to the jaws 42 in the previously described construction except that their radially inner faces in this case are each formed to provide a V-surface 62, all of which cooperate to form a hexagonal opening for receiving a hexagonally sectioned piece of work. Obviously, jaws such as 42 the inner faces of which are formed to any particular size or shape to correspond with the work to be operated upon may be readily and quickly substituted for those shown, and when any set of such jaws becomes worn, they may be readily replaced. Inasmuch as the jaws 42 or the equivalent seat against the radially inner faces 44 of the supports 40 against which they are drawn by the screws 50, and inasmuch as the centrifugal force on the jaws during the operation also tends to maintain them securely in contact with the seats 44 of the holders 40, and because of the fact that the holders 40, are, in effect, integral with the diaphragm 22, no shifting of the jaws 42 will occur under any normal circumstances. "Integral," "integrally united," and equivalent expressions used in the specification and claims of this application are intended to designate parts which are joined so as to form in effect a one-piece construction. Typical examples are parts formed in one piece by welding, brazing, or casting. These expressions are intended to distinguish one-piece constructions of the type referred to above from constructions wherein the parts are fastened together by bolts, screws and the like.

Having thus described our invention, what we claim by Letters Patent is:

1. In a diaphragm chuck of the class wherein there is a mounting plate and a diaphragm fixed at its periphery with respect thereto and capable of axially yielding at its center, the combination with said diaphragm of a plurality of jaw supports mounted on the axially outer face thereof in angularly spaced relation with respect to each other, means integrally uniting said jaw supports and said diaphragm, said jaw supports having arcuate inner seating surfaces and arranged with said seating surfaces generally in the form of a circle disposed concentrically to the axis of rotation of said chuck, a jaw device seating against each of said seats and having an arcuate outer surface complementary thereto, and means removably securing said jaw devices to said jaw supports.

2. In a diaphragm chuck, in combination, a backing member, a diaphragm integrally united at its periphery with said backing member, a plurality of jaw devices mounted on the diaphragm in angularly spaced relation with respect to each other, said jaw devices being integrally united with said diaphragm, said backing plate, diaphragm and jaw devices forming in effect a one-piece unit to prevent creepage between the diaphragm and connecting parts due to internal stresses, which creepage results when the diaphragm is fastened by screws and the like.

3. In a diaphragm chuck of the class wherein there is a mounting plate and a diaphragm having a central opening fixed at its periphery with respect thereto and capable of axially yielding at its center, the combination with said diaphragm of a plurality of jaw supports mounted on the axially outer face thereof in angular spaced relation with respect to each other, said jaw supports being of a length radially of the axis of the chuck equal to a major portion of the distance between the periphery of the opening in said diaphragm and the periphery of said diaphragm, means integrally uniting said jaw supports and said diaphragm, jaw elements mounted on the ends of said jaw supports, and means detachably securing said jaw elements to said jaw supports.

4. In a diaphragm chuck, a backing plate, a diaphragm arranged with its periphery in engagement with the backing plate and a fusional connection uniting the engaged portions of said backing plate and said diaphragm, said fusional connection forming in effect a one-piece unit and enhancing the accuracy of the chuck by preventing internal stresses which are created in the diaphragm when conventional fastening means such as screws and the like are employed to fasten the same to the backing plate.

5. In a diaphragm chuck, a backing plate, a cup-shaped diaphragm having the open face thereof peripherally piloted on said backing plate, and fusion means uniting said backing plate and said diaphragm, said fusion means forming in effect a one-piece unit and enhancing the accuracy of the chuck by preventing internal stresses which are created in the diaphragm when conventional fastening means such as screws and the like are employed to fasten the same to the backing plate.

GEORGE HOHWART.
ERNEST F. HOHWART.

REFERENCES CITED

The following references are of record in the file of this patent:

UNITED STATES PATENTS

| Number | Name | Date |
|---|---|---|
| 1,315,467 | Church | Sept. 9, 1919 |
| 1,426,541 | Bisset | Aug. 22, 1922 |
| 2,046,052 | Bechler | June 30, 1936 |
| 2,403,599 | Hohwart et al. | July 9, 1946 |

FOREIGN PATENTS

| Number | Country | Date |
|---|---|---|
| 474,962 | Great Britain | of 1937 |